C. OTTOSEN & H. R. WRIGHT.
ICE CREAM CONTAINER.
APPLICATION FILED MAR. 2, 1914.
1,138,144.
Patented May 4, 1915.
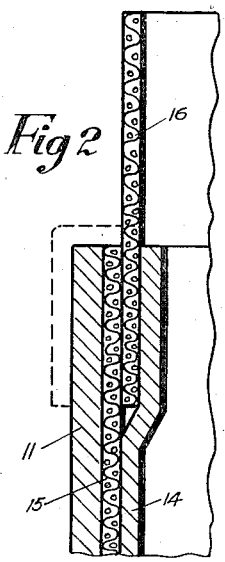
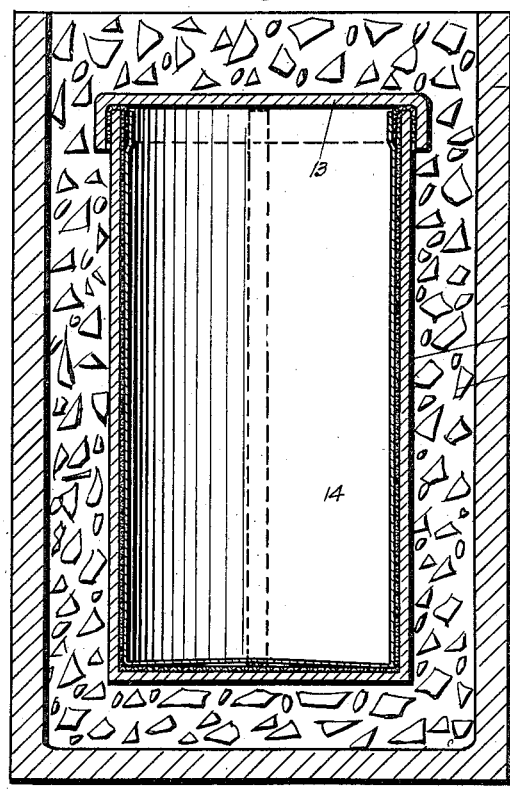
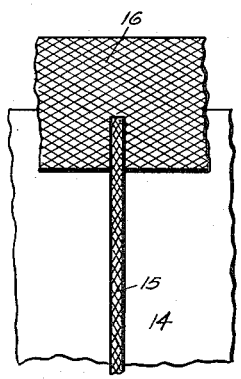
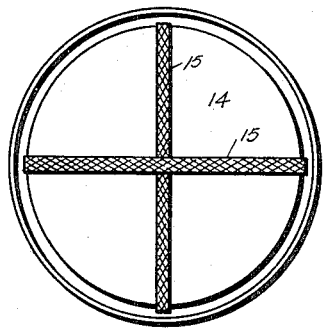
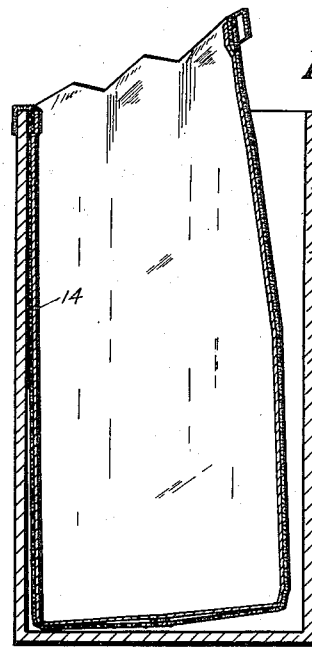
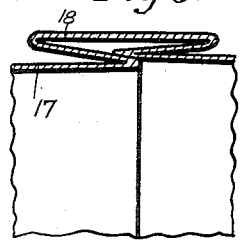
Witnesses
Frits Søgelcke
A. G. Hague
Inventors
Christopher Ottosen & Herbert R. Wright
by Orwig & Bair
Atty's

UNITED STATES PATENT OFFICE.

CHRISTOPHER OTTOSEN, OF OTTOSEN, AND HERBERT R. WRIGHT, OF DES MOINES, IOWA.

ICE-CREAM CONTAINER.

1,138,144. Specification of Letters Patent. Patented May 4, 1915.

Application filed March 2, 1914. Serial No. 822,088.

*To all whom it may concern:*

Be it known that we, CHRISTOPHER OTTOSEN and HERBERT R. WRIGHT, citizens of the United States, and residents of Ottosen and Des Moines, in the counties of Humboldt and Polk, State of Iowa, respectively, have invented a new and useful Ice-Cream Container, of which the following is a specification.

The object of our invention is to provide an inner container for ice cream cans and the like of simple, durable and inexpensive construction.

More particularly it is our purpose to provide an inner container of the kind mentioned, made of paper or other inexpensive material, suitably water proof and designed to fit the inside of a can to prevent the access of moisture to the metal parts.

Still a further object is to provide such a device having suitable reinforcing means, and provided with a means for fitting the inner receptacle to the top of the can.

Our invention consists in certain details, in the construction, combination and arrangement of the various parts of the device, whereby the objects contemplated are attained, as hereinafter more fully set forth, pointed out in our claim and illustrated in the accompanying drawing, in which:

Figure 1 shows a vertical, central, sectional view through an ice cream packer and ice cream can and a receptacle therein, embodying our invention. Fig. 2 shows a vertical, transverse, sectional view through the upper portion of an ice cream can and an inner receptacle embodying our invention, showing the reinforcing strip around the top of the receptacle before it is folded over the can top. Fig. 3 shows an inverted plan view of the inner receptacle. Fig. 4 is a vertical, sectional view through the ice cream can and the inner receptacle, showing the inner receptacle partially removed from the can. Fig. 5 shows a detail, sectional view of a portion of the upper part of the inner receptacle, viewed from the outside thereof, and Fig. 6 shows a horizontal, sectional view through the wall of a modified form of the inner receptacle.

In the accompanying drawing we have used the reference numeral 10 to indicate generally an ice cream packer of ordinary construction in which is an ice cream can 11, packed in ice 12, in the ordinary way. On the upper end of the can 12 is a cover 13.

Our inner receptacle comprises a sack 14, made of paper, preferably water proof. It is our purpose to make the receptacle 14 of as inexpensive material as possible. Each sack or receptacle 14 is cylindrical in form and designed to fit snugly the inside of the can 11. In the preferred form of our inner receptacle, reinforcing strips 15 are extended around the receptacle on the outside thereof, from its upper edge on one side to its upper edge on the other side. We preferably employ two such strips, as clearly shown in Fig. 3 and by the full and dotted lines in Fig. 1. The reinforcing strips may be of tape or suitable material. Around the upper edge of the receptacle 14 and secured to the outer surface thereof, between said outer surface and the reinforcing strips 15 is a band or strip 16, extending entirely around the upper end of the receptacle 14, and extending above the upper edge thereof. The band 16 is of suitable material, which is sufficiently flexible and preferably stiff enough to permit it to be folded outwardly and downwardly over the upper edge of the can 11, as shown by the dotted lines in Fig. 2.

In Fig. 6 we have shown a modified form of the wall of the receptacle 14. In said figure, the receptacle 14 is indicated generally by the reference numeral 17. The wall of the receptacle 17 is provided with folds 18, arranged vertically of the receptacle and serving as reinforcing strips.

In the practical use of our improved device, the receptacle 14 is placed within the can 11 and the strip 16 is folded over the upper edge of the can, as shown by the dotted lines in Fig. 2. The ice cream is then poured into the can in the ordinary way. When the ice cream has been removed from the can, the strip 16 or the upper ends of the strips 15 may be grasped for removing the receptacle 14 from the can. The receptacle 14 is preferably removed by pulling the upper edge thereof inwardly toward the center of the can, as illustrated in Fig. 4, until the walls of the receptacle 14 are withdrawn from the inner surface of the can 11. It is practically impossible to pull the inner receptacle 14 directly upwardly until it has been first drawn partially away from the walls of the can. On account of the reinforcing strips it is made easy to withdraw the receptacle 14 from the can.

The receptacle is made of inexpensive material so that it may be thrown away after having been used once. The folds 18 of the modified form of the device shown in Fig. 6 serve substantially the same purpose as the reinforcing strips 15. We have found that where no such strips, folds or reinforcing means are used, the paper at the upper end of the receptacle will tear readily and it is sometimes difficult to remove it from the can. The advantages of such a receptacle are numerous. The water proof paper can be made completely sanitary and kept perfectly clean so that the ice cream when packed therein is clean and sanitary. The ice cream is saved from contact with the metal walls of the can.

In the use of ice cream cans they are frequently allowed to stand until small patches of rust form on their inner surfaces and these are very difficult to clean. Even while the cans are new they are frequently not properly cleaned before a second using. The use of our improved receptacle lengthens the life of the can on account of the fact that the inner surface thereof is not kept wet as when cans are used in the ordinary way. It frequently happens that a small amount of melted cream is left in the bottom of the can in which case the bottom is very likely to become badly rusted. This will be avoided where our improved receptacles are used for the reason that even if a small amount of cream is left in the can it will be contained in the water proof paper receptacle until the latter is removed and the walls of the can will be protected.

It will be understood that some changes may be made in the details of the construction of our ice cream container without departing from its essential features and it is our intention to cover any such changes which may be included within the scope of the following claim.

We claim as our invention:

In a device of the class described, a container comprising a paper sack designed to fit inside an ice cream can, reinforcing strips extending across the bottom of said sack and up the sides to points above the top thereof on the outer surface of said sack, and adapted to reinforce the sack and to serve as a support and handle therefor.

Des Moines, Iowa, February 10, 1914.

CHRISTOPHER OTTOSEN.
HERBERT R. WRIGHT.

Witnesses:
  M. WALLACE,
  S. ROBINSON.